Figure 1:
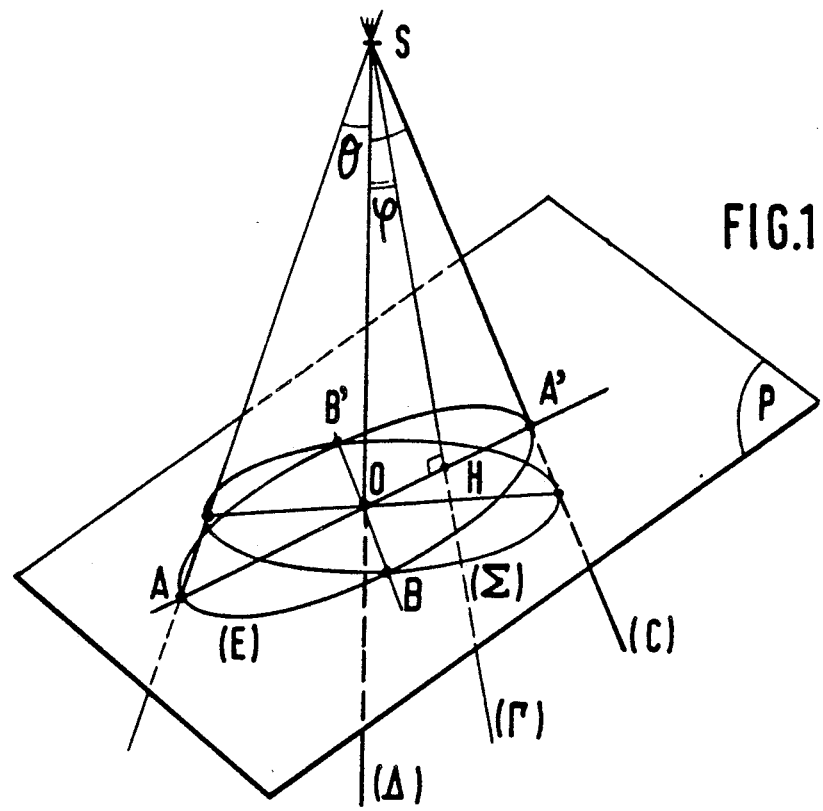

United States Patent [19]

Sutour

[11] Patent Number: 4,995,722
[45] Date of Patent: Feb. 26, 1991

[54] SYSTEM FOR ASSISTING HOVERING AIRCRAFT TO LAND ON THE PLATFORM OF A VESSEL

[75] Inventor: Laurent Sutour, Victor Hugo Hauts De Seine, France

[73] Assignee: Societe Anonyme De Telecommunications, Paris, France

[21] Appl. No.: 406,537

[22] Filed: Sep. 13, 1989

[30] Foreign Application Priority Data

Sep. 14, 1988 [FR] France .................................. 88 11962

[51] Int. Cl.[5] ...................... G01B 11/26; G01C 1/00
[52] U.S. Cl. ................................ 356/152; 244/17.17; 340/946; 356/4
[58] Field of Search ...................... 244/17.17; 340/946, 340/948, 952, 953; 356/14, 141, 152

[56] References Cited

U.S. PATENT DOCUMENTS

| 3,671,963 | 6/1972 | Assouline et al. | 340/948 |
| 3,721,499 | 3/1973 | Narbaits-Jaureguy . | |
| 3,727,055 | 4/1973 | David et al. . | |
| 3,765,770 | 10/1973 | McConnell et al. | 340/946 |
| 3,790,276 | 2/1974 | Cook et al. | 356/152 |
| 3,843,263 | 10/1974 | Snead | 340/946 |
| 4,209,767 | 6/1980 | Flanders | 340/947 |
| 4,291,977 | 9/1981 | Erdmann et al. | 356/152 |
| 4,695,013 | 9/1987 | Trampnau | 340/946 |
| 4,710,620 | 12/1987 | Kunkel | 356/152 |

FOREIGN PATENT DOCUMENTS

| 0015199 | 3/1980 | European Pat. Off. . | |
| 1605307 | 2/1974 | France . | |
| 2569838 | 3/1986 | France . | |
| 3629911 | 3/1988 | France | 340/947 |

OTHER PUBLICATIONS

Rev. Sci. Instrum., 57, 1986, Jun., #6, Kato et al.

Primary Examiner—Stephen C. Buczinski
Attorney, Agent, or Firm—Barnes & Thornburg

[57] ABSTRACT

The aircraft (1) incorporates means for emitting a conical light beam (14). The vessel (2) incorporates photosensitive cells (6) materializing the outline of the beam on the vessel, which is an ellipse (7). Means determine the equation of the ellipse (17) and, from this, landing data which are displayed on a panel (25).

9 Claims, 2 Drawing Sheets

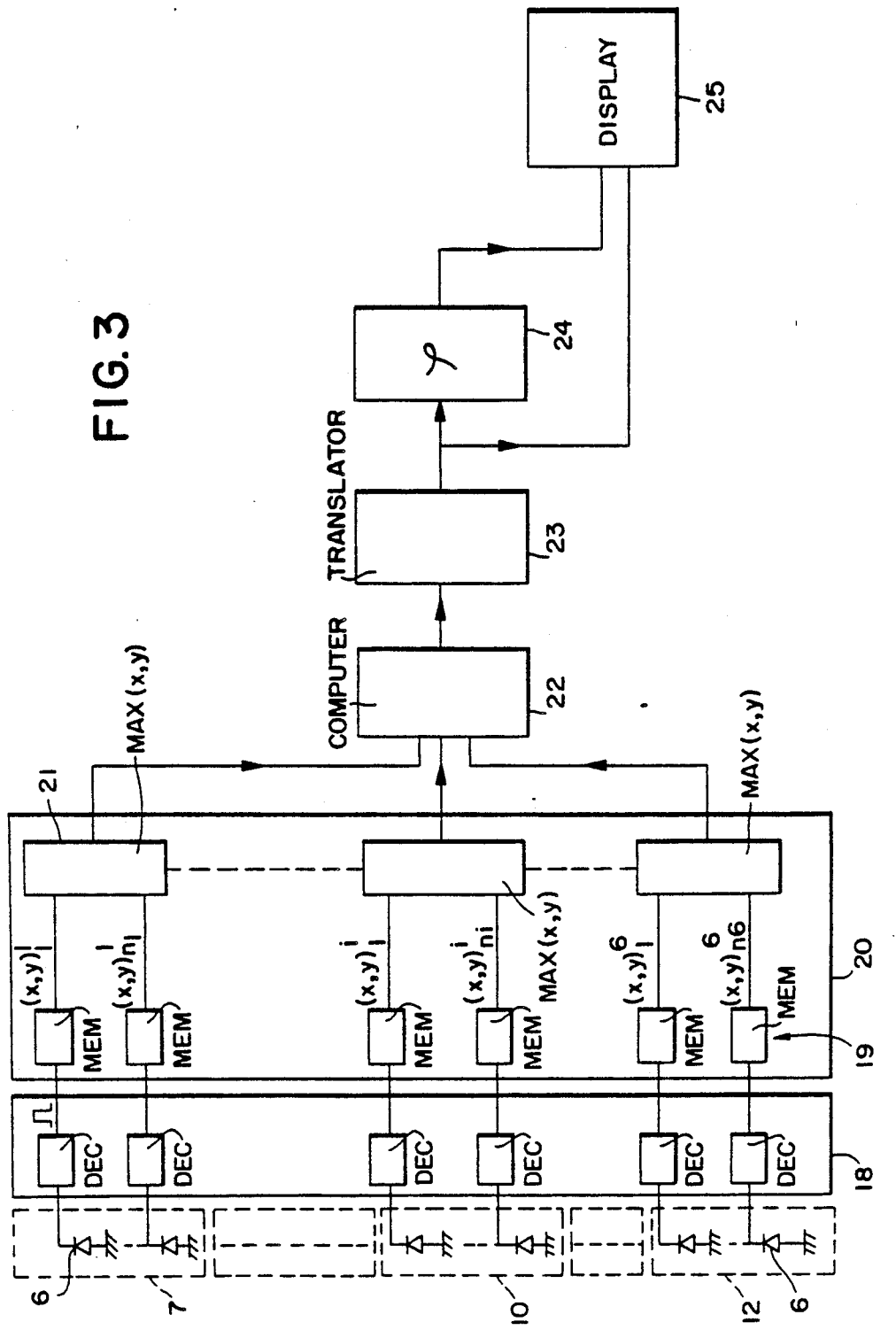

SYSTEM FOR ASSISTING HOVERING AIRCRAFT TO LAND ON THE PLATFORM OF A VESSEL

The present invention concerns a system for assisting a hovering aircraft to land on the platform of a vessel.

A helicopter, or an aeroplane capable of hovering, lands on them platform of a naval vessel, a priori other than a helicopter carrier, by positioning the aircraft at a determined height, generally one or two metres, above a grid on the platform, two to three metres in diameter, whilst dropping from the aircraft a harpoon, or hook, which is then attached to the grid, and by winding onto a winch a cable at the end of which the harpoon is secured in order to pull the helicopter towards the platform, or deck, of the vessel, and then landing on it.

From a distance of a few nautical miles, approximately two, up to the end of the vessel, the helicopter is guided on a descent plan without any difficulty, using optical devices of the VASIS type (visual approach slope, indicator system). Up till then, the movements of the vessel are not important. They become so afterwards, in the final stage of landing, as the harpoon must not be dropped outside the grid, and the aircraft must come down level on the platform. However, the pilot cannot see beneath his aircraft.

In order to resolve this difficulty, a landing officer or "batman" is used on the one hand, and on the other hand a horizontal reference bar (HRB) fixed at the top of a hangar erected on the platform and which the pilot is able to see, the bar being controlled in order to remain horizontal and the pilot bringing his aircraft down only when said bar is parallel to the roof of the hangar.

The difficulty, however, is only partly reduced. The HRB bar certainly provides a reference with respect to rolling, and the batman assists the pilot as much as he is able. But his is not completely satisfactory. The pilot does not know his altitude above the platform - the altimeter sensor is inoperative because of the magnetic masses, and the pounding of the ship may be considerable - nor the distance from his aircraft to the hangar, which must remain sufficient for clearance of the rotor blades, and he has no references for the angle of elevation, pitch and yaw references - the magnetic compass being just as disturbed as the sensor by the magnetic masses. In short, the quality and accuracy of the landing depends too much on the batman.

The present invention aims to alleviate this disadvantage.

A system of positioning a first object with respect to a second object is already known through the document FR-A-2 569 838, and corresponding U.S. Pat. No. 4,710,620 comprising means for emitting a beam of particles, on one of the two objects, sensitive means, on the other one of the two objects, for receiving the particles of the beam and for materialising the cross-section of the beam on the second object and means, in a reference connected to the second object, for determining the said cross-section and, from this, position date.

However, this known system is a system for assisting the docking of one active space vehicle on another passive space vehicle. It cannot be suitable for the landing of aircraft on the platform of a vessel. Indeed, the said system is essentially based on an obscuring component on board them passive vehicle and which projects out of its surface. If such a system were adopted for the landing of aircraft on the platform of a vessel, either the aircraft could not land, or else they would be in danger of destroying the obscuring component thus rendering the system unusable.

The applicant, whilst drawing inspiration from the said solution for assisting the docking of space vehicles, has therefore sought a solution for assisting landing avoiding the use of a batman and thus puts forward his invention.

The present invention concerns a system for assisting the landing, in its final stage, of a hovering aircraft on the platform of a vessel, comprising means for emitting a beam of particles, sensitive means for receiving the particles of the beam and materialising the cross-section of the beam on the platform, and means, in a reference connected to the platform, for determining the said cross-section and, from this, landing date, characterized by the fact that the means of emission are on the aircraft which has to land on the platform and emit a conical beam of particles, the sensitive means are on the platform of the conical beam emitted from the aircraft, the means for determining the said cross-section are on the platform and the system incorporates means for displaying landing data from said means of determination.

Preferably, the beam of particles is a light beam and the receiving means are photosensitive means, the reference has as its origin the centre of a landing grid, the photosensitive means comprise photosensitive cells arranged along the arms, preferably six, of a cross, also preferably centred on the origin of the reference, the mans for emitting the light beam are arranged to emit a conical beam of revolution and has an aperture angle and an axis, preferably merged with the vetical of the aircraft, such that the intersection of the beam by the platform is an ellipse.

The light beam may be emitted in visible light or otherwise, for example in infrared by a laser source; it can be hollow or full; it being understood that in the latter case, it is the outline of the beam on them platform which makes it possible to determine the landing data. It will be noted that instead of a light beam, an electromagnetic beam, preferably of a frequency approximately between 30 and 60 GHz, could be emitted.

Whils it is indeed the problem of landing helicopters which has fiven rise to the present invention, the applicant does not for all the intend to limit it to this area of use.

The invention thus concerns, in a more general way, a system of positioning a first object with respect to a second object comprising means for emitting a beam of particles, on one of the two objects, sensitive means, on the other one of the two objects, for receiving the particles of the beam and for materialising the cross-section of the beam on the second object and means, in a reference connected to the second object, for determining the said cross-section and, from this, position data, characterized by the fact the means of emission are on the first object to be positioned with respect to the second object and emit a conical beam of particles, the sensitive means are on the second object, the said cross-section is the intersection by the second object of the conical beam emitted from the first object, said means for determining the said cross-section are on the second object and the system incorporates means for displaying them position data from said means of determination.

Thus the invention can also well be applied for example in the area of machine tools.

Figure 2:
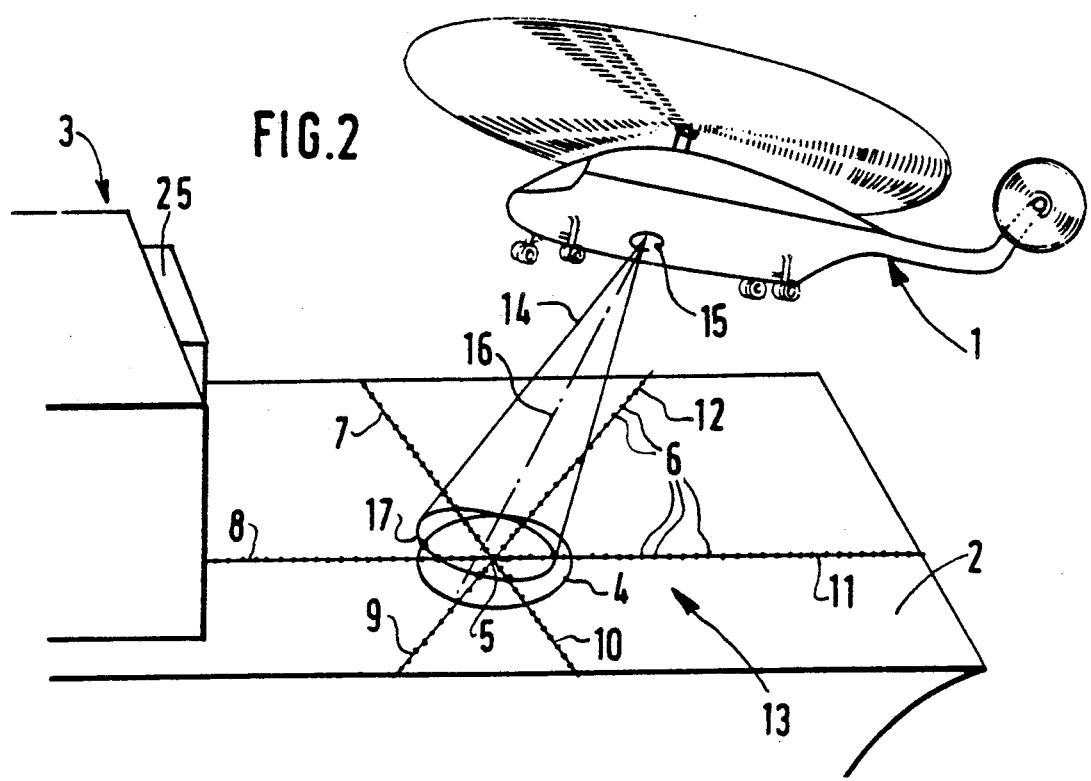

The invention will be better understood through the following description of the landing aid system of the invention, with reference to the attached drawings, in which FIG. 1 shows a schematic view illustrating the implementation of the system of the invention, between a helicopter and the platform of a vessel;

FIG. 2 shows the cross-section of a cone of revolution as intersected by a plane, and FIG. 3 shows schematically the blocks of the processing unit of the system of FIG. 1.

Let us begin by showing, with reference to FIG. 1, how it is possible to determine, from the equation of an ellipse (E), the intersection by a plane (P) of a cone of revolution (C) with a given aperture angle $2\theta$, the angle $\phi$ between the axis ($\Delta$) of the cone and the perpendicular ($\Gamma$) to the plane (P) passing through the apex (S) of the cone, and also the distance SH from the apex of the cone (C) to the plane (P).

Therefore, in the plane (P) intersecting the cone (C), let as consider the ellipse (E), the intersection of the two surfaces whose equations in an orthonormal reference (x,y), are $$P_1 x^2 + P_2 y^2 + P_3 xy + P_4 x + P_5 y + P_6 = 0 \quad (1)$$

The rotation and rectilinear translation of the reference x, y are determined, which are required to obtain the reduced equation of the ellipse (E)

$$\frac{X^2}{a^2} + \frac{Y^2}{b^2} - 1 = 0 \quad (2)$$

$2a$ and $2b$ being the length of the major axis and minor axis of the ellipse, in the orthonormal reference (X,Y) having the centre 0 of the ellipse (E) as its origin, its focal axis as the X'OX axis and its non-focal axis as the Y'OY axis. Having six known parameters ($P_1$-$P_6$), and a linear translation and a rotation each being determined by two parameters, it is then necessary to resolve a system of six equations with six unknowns in order to determine the axes of the ellipse (E) which are two others from amongst the said six unknowns.

Having thus determined the lengths $2a$ and $2b$ of the major axis AA' and the minor axis BB' of the ellipse (E), and the straight line ($\Gamma$) intersecting the plane (P) at point H on the major axis AA', it is possible to write down, assuming that SH=Z, AH=T and A'H=U, $$tg(\theta - \phi) = \frac{U}{Z} \quad (3)$$

$$tg(\theta + \phi) = \frac{T}{Z}$$

$$\frac{U + T}{Z} = \frac{2a}{Z} = tg(\theta + \phi) + tg(\theta - \phi)$$

$$2a = Z\left(\frac{tg\theta + tg\phi}{1 - tg\theta tg\phi} + \frac{tg\theta - tg\phi}{1 + tg\theta tg\phi}\right)$$

The intersection of the cone (C) by the plane perpendicular to ($\Delta$) passing through 0 is a circle ($\epsilon$) of radius R equal to half b of the minor axis of the ellipse (E), the circle ($\epsilon$) and the ellipse (E) intersecting along the minor axis BB' of the ellipse (E).

It is then possible to write down $$tg\theta = \frac{R}{OS} \quad (4)$$

$$OS = \frac{R}{tg\theta}$$

$$Z = OS \cos\phi$$

$$Z = \frac{R\cos\phi}{tg\theta}$$

$$Z = \frac{b\cos\phi}{tg\theta}$$

Assuming that $tg\phi = A$ and $tg\theta = C$, the following is arrived at, by considering equation (3)

$$2a = Z\left(\frac{A + C}{1 - AC} + \frac{C - A}{1 + AC}\right) \quad (5)$$

$$2a[(1 + AC)(1 - AC)] =$$

$$Z[(A + C)(1 + AC) + (C - A)(1 - AC)]$$

Assuming that tg $$\frac{\phi}{2} = \psi,$$

then $$\cos\frac{\phi}{2} = \frac{1 - \psi^2}{1 + \psi^2} \quad (6)$$

$$tg\phi = \frac{2\psi}{1 - \psi^2}$$

$$A = \frac{2\psi}{1 - \psi^2}$$

If the value of A, expressed by the relation (6), is substituted into the equation (5), a and c being known, a sixth degree equation for $\psi$ is obtained.

By an approximate numerical method (Newton method, by dichotomy, etc) $\psi$ and therefore the angle $\phi$ are easily determined from this.

Z is deduced from this using the equation (4).

The landing aid system can now be dealt with. This is a system designed to enable for exemple a helicopter 1 to land correctly on the deck, or the platform 2, of a vessel 3, for exemple a frigate.

The system comprises an airborne part, on board the helicopter, and a fixed part, on board the vessel.

The fixed part comprises a traditional landing grid, with a centre 5, laid out on the platform 2 and represend by its external outline 4 in FIG. 2, photosensitve diodes 6, also laid out on the platform, intended to receive the radiation from a source mounted on the helicopter and which will be dealt with later a processing unit and, in this case, a display unit. The photosensitive cells 6, whose respective coordinates are determined, partly embedded in the platform; with only their receiving window projecting out of it, are arranged at regular intervals along six straight arms 7-12, staggered at 60 angles, from a cross 13 centred on the centre 5 of the landing grid 4. The diodes are laid out as far as the edges of the platform.

The airborne part comprises a source for emitting, through the bottom 15 of the helicopter fuselage, a light beam 14, in this case full, conical of revolution, with an axis merged with the vertical 16 of the helicopter and with a given aperture angle 2.

In this case it is a laser generator emitting in the infrared range, with its associated optics; the cells 6 being infrared diodes which are also all of a conventional type, for example made of HgCdTe.

In order not to be subjected to disturbances from background radiation, the generator is in this case modulated at a frequency of 800 Hz, obtained by rectifying two half-cycles of the 400 Hz frequency available on board.

The beam 14 illuminates the platform 2 and lights up the diodes 6 in accordance with an elliptical outline 17.

The processing unit, from the coordinates of the illuminated diodes 6 located on the ellipse 17, or from those which are closest to this contour, thus has available coordinates of six points on the ellipse, subject to the measuring error which may thus be equal to the spacing between the diodes 6, from which it will be possible to formulate the landing data.

The signals delivered by the illuminated diodes 6 on the six arms 7-12, each containing $n_i (i = 1 \ldots 6)$ of them, are filtered and formed in a decoder module 18 for reading the memories 19 of a module 20 supplying the coordinates $(x,y)^1$ from those of the $n_i$ cells, for the ith arm, which are illuminated. Six circuits 21, of the module 20, extract from these and deliver the couples of the maximum coordinates of the six groups of diodes, respectively. The coordinates thus extracted, at the output of the module 20, have been established in an orthonormal reference connected to the platform and having the centre of the landing grid as its origin, the longitudinal axis of the vessel as its x'Ox axis, and the transverse axis of the vessel as its y'oy axis.

In the computer module 22, which thus receives the coordinates of the six points of the ellipse 17, and with reference to the equation (1) above, the ellipse being defined by six parameters, the system of six equations with six unknowns is resolved which gives the parameters $P_1$-$P_6$ of the ellipse.

It will be noted that the computation of the equation of the ellipse can be carried out with less than six points, and therefore less than six arms, but, of course, to the detriment of accuracy.

In the module 23 a change of reference is carried out, by rotation and rectilinear translation, in order to calculate the equation of the ellipse 17 in the orthonormal reference having its centre as its origin, its focal axis as its X'OX axis, and its non-focal axis as its Y'OY axis, and determining, in the reference connected to the platform:
the coordinates of the centre of the ellipse,
the orientation of the ellipse,
the lengths of the major axis and the minor axis of the ellipse.

With reference to the above passage describing FIG. 1, the inclination $\phi$ of the beam 14 to the vertical of the platform 2 is determined in the module 24, that is to say the inclination of the axis of the beam to the vertical of the plane of the ellipse, that is to say the angle of presentation of the aircraft, together with the altitude Z of the helicopter above the platform.

The data delivered by the modules 23 and 24 are transmitted to the display unit 25 and displayed for the attention of the helicopter pilot. The display may for example be in the form of a panel of coloured bulbs, arranged on board the helicopter and indicating to the pilot that his aircraft is too high, too low, too far to the right, that it is improperly oriented, that it is not horizontal, or that he can proceed to drop the landing harpoon. It may also take the form of a panel arranged on board the helicopter, combined with a conventional transmission system.

I claim:

1. A system for assisting the landing, in its final stage, of a hovering aircraft on the platform of a vessel, comprising:
   emitting means on said aircraft for emitting a conical beam;
   sensitive means on said platform for being sensitive to the cross-section of said conical beam on said platform;
   determining means on said vessel for determining said cross-section with respect to a reference on said platform from said sensitive means and determining landing data for said aircraft from said cross-section; and
   display means on said vessel for displaying the landing data from said determining means.

2. System as claimed in claim 1, in which said emitting means emits a light beam and said sensitive means are photosensitive means.

3. System as claimed in claim 2, in which said photosensitive means comprise photosensitive cells arranged along the arms of a cross.

4. System as claimed in claim 3, in which said photosensitive means further comprise a third line of photosensitive cells intersecting said cross at its center.

5. System as claimed in claim 1, in which said determining means determines, from the cross-section of the beam, the distance from the apex of the beam to the plane of said cross-section.

6. System as claimed in claim 1, in which said emitting means emits a conical beam of revolution.

7. System as claimed in claim 6, in which said determining means determines the inclination of the axis of the beam to the vertical of the plane of said cross-section.

8. System as claimed in claim 6, in which said emitting means emits a beam with an axis and an aperture angle such that said cross-section is an ellipse.

9. System as claimed in claim 1, in which said reference has as its origin the centre of a landing grid.

* * * * *